US012038381B1

(12) United States Patent
Deng et al.

(10) Patent No.: US 12,038,381 B1
(45) Date of Patent: Jul. 16, 2024

(54) METHODS OF REDUCING SPECTRAL CROSSTALK IN MULTIPLEXED FLUORESCENCE IMAGING

(71) Applicant: RareCyte, Inc., Seattle, WA (US)

(72) Inventors: Lily Deng, Seattle, WA (US); Jeremy Ryan Cooper, North Bend, WA (US)

(73) Assignee: RareCyte, Inc., Seattle, WA (US)

( * ) Notice: Subject to any disclaimer, the term of this patent is extended or adjusted under 35 U.S.C. 154(b) by 0 days.

(21) Appl. No.: 18/452,434

(22) Filed: Aug. 18, 2023

(51) Int. Cl.
*G01N 21/64* (2006.01)
(52) U.S. Cl.
CPC ..... *G01N 21/6458* (2013.01); *G01N 21/6486* (2013.01)

(58) Field of Classification Search
CPC .............. G01N 21/6458; G01N 21/6486
See application file for complete search history.

(56) References Cited

U.S. PATENT DOCUMENTS

| | | | |
|---|---|---|---|
| 2015/0177148 A1 | 6/2015 | Estrada | |
| 2020/0348234 A1 | 11/2020 | Hendrix et al. | |
| 2021/0140889 A1* | 5/2021 | Sherman | ............ G01N 21/6458 |
| 2022/0236183 A1 | 7/2022 | Anazawa et al. | |

* cited by examiner

*Primary Examiner* — Georgia Y Epps
*Assistant Examiner* — Don J Williams
(74) *Attorney, Agent, or Firm* — Shay Glenn LLP

(57) ABSTRACT

This disclosure provides methods of fluorescence microscopy imaging for the analysis of biological samples. More particularly, this disclosure provides methods of reducing crosstalk in multiplexed fluorescence imaging.

19 Claims, 12 Drawing Sheets

For each Fluorescent Probe of Interest, Prepare and Stain a Biological Sample

Acquire Donor Channel Image and Recipient Channel Images of Each Sample

Calculate Spectral Crosstalk Values for Selected Sub-population of Donor-Recipient Image Pairs Create Spectral Crosstalk Matrix of the Spectral Crosstalk Values Prepare a Sample and Stain with the same Fluorescent Probes of Interest Acquire a Multispectral Series of Fluorescent Images of the Sample Reduce Spectral Crosstalk by Applying the Spectral Crosstalk Matrix to the Multispectral Series of Fluorescent Images

| CHANNEL ID | FLUORESCENT PROBE | BIOLOGICAL TARGET |
|---|---|---|
| 1 | Hoechst | DNA |
| 4 | Argo515 | CD31 |
| 5 | Argo555L | CD45 |
| 6 | Argo535 | CD68 |
| 8 | Argo572 | CD4 |
| 9 | Argo584 | FOXP3 |
| 10 | Argo602 | CD8a |
| 11 | Argo624 | CD45RO |
| 12 | Argo660L | CD20 |
| 13 | Argo662 | PD-L1 |
| 14 | Argo686 | CD3e |
| 15 | Argo706 | CD163 |
| 16 | Argo730 | E-cadherin |
| 17 | Argo760 | PD-1 |
| 18 | Argo795 | Ki67 |
| 19 | Argo845 | Pan-CK |
| 20 | Argo875 | SMA |

FIG. 3

| Channel | Fluorophore/Biomarker | 1 Hoechst DNA | AF None/AF | 4 Arg515/CD31 | 5 Arg550/CD45 | 6 Arg555/CD8 | 7 Blank Blank | 8 Arg572/CD4 | 9 Arg584/FOXP3 | 10 Arg602/CD8a | 11 Arg624/CD45RO | 12 Arg660/CD20 | 13 Arg662/PD-L1 | 14 Arg686/CD3e | 15 Arg706/CD163 | 16 Arg730/E-Cadherin | 17 Arg760/PD-1 | 18 Arg795/Ki67 | 19 Arg845/Pan-CK | 20 Arg875/SMA |
|---|---|---|---|---|---|---|---|---|---|---|---|---|---|---|---|---|---|---|---|---|
| 1 | Hoechst/DNA | 1.000 | 0.098 | 0.002 | 0.001 | 0.001 | 0.001 | 0.001 | 0.001 | 0.001 | 0.001 | 0.000 | 0.001 | 0.000 | 0.000 | 0.000 | 0.000 | 0.000 | 0.000 | 0.000 |
| AF | None/AF | 0.249 | 1.000 | 0.316 | 0.335 | 0.196 | 0.230 | 0.101 | 0.124 | 0.139 | 0.142 | 0.077 | 0.017 | 0.016 | 0.012 | 0.010 | 0.007 | 0.004 | 0.003 | 0.006 |
| 4 | Arg515/CD31 | 0.001 | 0.025 | 1.000 | 0.291 | 0.297 | 0.213 | 0.000 | 0.000 | 0.000 | 0.000 | 0.001 | 0.001 | 0.001 | 0.001 | 0.001 | -0.001 | 0.000 | 0.000 | -0.001 |
| 5 | Arg550/CD45 | 0.000 | 0.005 | 0.127 | 1.000 | 0.544 | 0.687 | 0.000 | 0.000 | 0.000 | 0.006 | 0.001 | 0.000 | 0.000 | 0.000 | 0.000 | 0.000 | 0.000 | 0.000 | 0.000 |
| 6 | Arg555/CD8 | 0.018 | 0.047 | 0.082 | 0.110 | 1.000 | 0.739 | 0.017 | 0.010 | 0.010 | 0.015 | 0.007 | 0.007 | 0.006 | 0.000 | 0.002 | 0.000 | 0.000 | 0.000 | -0.002 |
| 7 | Blank/Blank | 0.000 | 0.000 | 0.000 | 0.000 | 0.000 | 1.000 | 0.000 | 0.000 | 0.000 | 0.000 | 0.007 | 0.000 | 0.000 | 0.000 | 0.000 | 0.000 | 0.000 | 0.000 | 0.000 |
| 8 | Arg572/CD4 | 0.002 | 0.008 | 0.002 | 0.012 | 0.025 | 0.165 | 1.000 | 0.702 | 0.483 | 0.353 | 0.058 | 0.001 | 0.000 | 0.000 | 0.002 | 0.000 | 0.000 | 0.000 | -0.001 |
| 9 | Arg584/FOXP3 | -0.002 | -0.009 | -0.003 | -0.001 | 0.000 | 0.016 | 0.744 | 1.000 | 0.483 | 0.302 | 0.046 | 0.002 | 0.001 | 0.001 | 0.002 | 0.000 | -0.001 | -0.001 | 0.000 |
| 10 | Arg602/CD8a | 0.000 | 0.001 | 0.000 | 0.000 | 0.000 | 0.001 | 0.078 | 0.532 | 1.000 | 0.545 | 0.163 | 0.073 | 0.048 | 0.025 | 0.000 | 0.000 | 0.000 | 0.000 | 0.000 |
| 11 | Arg624/CD45RO | 0.004 | 0.013 | 0.003 | 0.000 | 0.000 | 0.002 | 0.005 | 0.040 | 0.453 | 1.000 | 0.227 | 0.051 | 0.058 | 0.044 | 0.009 | 0.000 | 0.000 | 0.000 | -0.001 |
| 12 | Arg660/CD20 | 0.003 | 0.014 | 0.005 | 0.004 | 0.001 | 0.004 | 0.026 | 0.075 | 0.244 | 0.659 | 1.000 | 1.000 | 0.476 | 0.260 | 0.028 | 0.000 | 0.000 | 0.000 | -0.002 |
| 13 | Arg662/PD-L1 | 0.009 | 0.020 | 0.012 | 0.012 | 0.009 | 0.009 | 0.003 | 0.005 | 0.017 | 0.044 | 0.047 | 0.367 | 1.000 | 0.558 | 0.176 | -0.001 | 0.000 | 0.000 | 0.000 |
| 14 | Arg686/CD3e | 0.001 | 0.003 | 0.001 | 0.001 | 0.002 | 0.000 | 0.000 | 0.000 | 0.000 | 0.001 | 0.193 | 0.057 | 1.000 | 1.000 | 0.195 | 0.002 | 0.001 | 0.001 | 0.000 |
| 15 | Arg706/CD163 | 0.002 | 0.009 | 0.003 | 0.004 | 0.002 | 0.003 | 0.001 | 0.001 | 0.001 | 0.002 | 0.104 | 0.016 | 0.671 | 1.000 | 0.419 | 0.014 | 0.012 | 0.002 | 0.001 |
| 16 | Arg730/E-Cadherin | 0.005 | 0.018 | 0.006 | 0.007 | 0.005 | 0.005 | 0.002 | 0.004 | 0.017 | 0.023 | 0.032 | 0.016 | 0.230 | 0.971 | 1.000 | 0.211 | 0.156 | 0.047 | 0.022 |
| 17 | Arg760/PD-1 | 0.000 | 0.001 | 0.000 | 0.000 | 0.000 | 0.000 | 0.000 | -0.001 | -0.001 | 0.000 | 0.000 | 0.001 | 0.001 | 0.005 | 0.039 | 1.000 | 0.334 | 0.101 | 0.042 |
| 18 | Arg795/Ki67 | 0.001 | 0.004 | 0.000 | 0.000 | 0.000 | 0.001 | 0.009 | 0.011 | 0.007 | 0.006 | 0.002 | 0.004 | 0.001 | 0.004 | 0.003 | 0.422 | 1.000 | 0.222 | 0.117 |
| 19 | Arg845/Pan-CK | 0.003 | 0.011 | 0.004 | 0.005 | 0.016 | 0.018 | 0.002 | 0.004 | 0.010 | 0.014 | 0.005 | 0.013 | 0.007 | 0.005 | 0.002 | 0.007 | 0.067 | 1.000 | 0.361 |
| 20 | Arg875/SMA | 0.001 | 0.035 | 0.014 | 0.014 | 0.007 | 0.010 | 0.010 | 0.009 | 0.010 | 0.010 | 0.004 | 0.010 | 0.008 | 0.006 | 0.005 | 0.027 | 0.035 | 0.500 | 1.000 |

FIG. 10

METHODS OF REDUCING SPECTRAL CROSSTALK IN MULTIPLEXED FLUORESCENCE IMAGING

INCORPORATION BY REFERENCE

All publications and patent applications mentioned in this specification are herein incorporated by reference to the same extent as if each individual publication or patent application was specifically and individually indicated to be incorporated by reference.

TECHNICAL FIELD

This specification describes technologies relating to fluorescence microscopy imaging for the analysis of biological samples. More particularly, this specification relates to highly multiplexed fluorescence microscopy imaging processing and analysis.

BACKGROUND

Immunofluorescence imaging is a specialized type of microscopy often used for spatial biology studies, cell classification, analysis of protein expression, phenotypic profiling, and the investigation of tissue microenvironments. Immunofluorescence imaging uses specific antibodies tagged with fluorescent dyes, also known as fluorophores, to construct fluorescent probes for the detection of biomarkers in a sample. Using multi-channel immunofluorescence microcopy, multiple biomarkers of interest can be examined simultaneously. Examples of multi-channel immunofluorescence microcopy include multiplex immunofluorescence (MxIF), cyclic immunofluorescence (CyCIF), COdetection by inDEXing (CODEX), iterative indirect immune fluorescence imaging (4i), multiplex immunohistochemistry (mIHC), multiplexed ion beam imaging (MIBI), iterative bleaching extends multiplexity (IBEX) and imaging mass cytometry (IMC)).

Optimally, the fluorescent probes used for multiplexed immunofluorescence imaging can be selected to have minimally overlapping excitation spectra and emission spectra such that the data for each fluorophore can be acquired by a discrete channel of a fluorescence microscope having optimized acquisition settings for that fluorophore. Unfortunately, highly multiplexed immunofluorescence imaging often results in spectral overlap, or spectral crosstalk, of the emission spectra from multiple fluorescent probes. This crosstalk creates unwanted noise and frustrates the accurate detection and analysis of multiple biomarkers in a sample. Highly multiplexed immunofluorescence imaging can be further complicated by tissue samples that exhibit endogenous fluorescence, or autofluorescence, usually lacking well-defined excitation and emission spectra. The indiscreet nature of the autofluorescence spectrum can interfere and overlap with the fluorescent signals of interest in a sample, resulting in additional spectral overlap and crosstalk.

Current strategies to avoid spectral crosstalk often allow only a few fluorescent probes to be used concurrently to stain a sample. The use of a limited number of fluorescent probes may necessitate multiple rounds of immunofluorescence imaging to get the needed data, with each additional round adding more time, requiring more reagents, and threatening the integrity of the sample. Therefore, there is a need for improved methods of managing spectral overlap and reducing crosstalk from multiplexed fluorescence images.

SUMMARY

Disclosed are novel methods of reducing spectral crosstalk in multiplexed fluorescence images. The disclosed methods may include acquiring a fluorescence image with one spectral channel of a florescent microscope of a biological sample (e.g., sectioned tissue sample) stained with a fluorescent probe and acquiring at least one additional fluorescence image of the same field of view of the same biological sample with other spectral channels of the fluorescent microscope.

In some embodiments, a comparison of a set of fluorescent images acquired with multiple channels of a sample stained with a probe may be used to calculate spectral crosstalk values of image pairs. In certain embodiments, a sub-population of pixels of the fluorescent image pairs may be used to calculate spectral crosstalk values. For example, spectral crosstalk values of a donor-recipient image pair may be calculated using a sub-population of pixels of the donor channel image and the corresponding pixels of the at least one recipient channel image in some embodiments, the spectral crosstalk values from a sub-population of pixels of the fluorescent image pairs are used to create a spectral crosstalk matrix of the spectral crosstalk values.

In some embodiments, these methods may be repeated for any desired set of probes to create a spectral crosstalk matrix as a control reference dataset, or single-color control dataset, for that set of probes. The control dataset may then be used for image processing of multiplexed fluorescence images. For example, in some embodiments, a multispectral series of fluorescence images may be acquired of a biological sample that has been stained with at least two fluorescent probes, where the fluorescent probes were also used to calculate the spectral crosstalk value and create the spectral crosstalk matrix. In such an embodiment, the image acquisition settings used to acquire the multispectral series of fluorescence images may be the same settings used to create the spectral crosstalk matrix.

In some embodiments, spectral crosstalk observed in the multispectral series of fluorescence images may be reduced by applying the spectral crosstalk matrix to the acquired multispectral series of fluorescence images. In some embodiments, the methods of reducing spectral crosstalk in multiplexed images comprise one or more steps that may be performed with a computer processor, computing systems, and non-transitory computer readable storage mediums, etc.

DESCRIPTION OF THE DRAWINGS

These and other features and advantages of the various embodiments disclosed herein will be better understood with respect to the following description of the drawings:

FIG. 3 is a table listing microscope spectral channels, their associated fluorophores, and the target biomarkers.

FIG. 10 shows a spectral crosstalk matrix for donor-recipient image pairs. Each row is a donor channel, and each column is a recipient channel; heat mapping with darker colors indicates relative larger spectral crosstalk values for the donor-recipient image pair.

DETAILED DESCRIPTION

Figure 1:
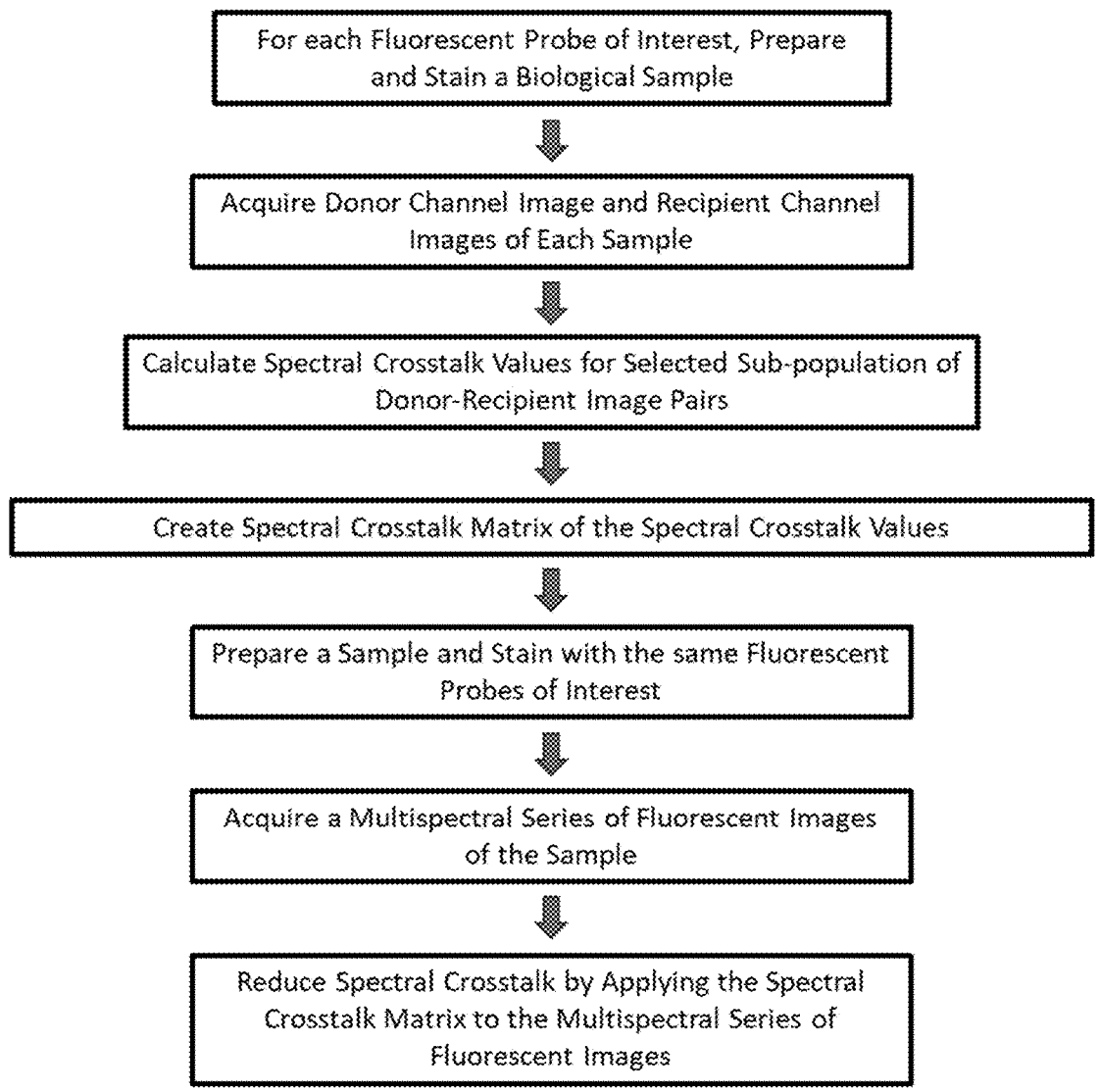
FIG. 1 is an exemplary workflow of a method of reducing spectral crosstalk in a multiplex fluorescence image.

This disclosure relates to methods of immunofluorescence imaging, processing, and analysis, including the reduction of spectral crosstalk that may be observed during multiplexed immunofluorescence imaging of a biological sample.

A digital image of a biological sample acquired with a fluorescence microscope may be considered a map of the photons that are emitted from fluorophores following excitation of the sample. In some embodiments, the acquired digital image is divided into multiple units called pixels. Each pixel in the image may represent a discrete area of the sample and may have an associated pixel intensity value. In a grayscale image, for example, lower pixel intensity values may appear darker and higher intensities may appear lighter. In some such embodiments, the pixels may be pseudocolored to approximate the color of each fluorophore's emission spectra, with the color brightness approximating the intensity value associated with the pixel. In some embodiments, the intensity value represents the number of photons detected by the camera at certain locations of the sample.

The methods disclosed herein include at least some steps that may be performed partially or entirely in an automated manner using one or more processors, algorithms, methods, and techniques used to extract information from one or more images. In some embodiments of the methods disclosed herein, image processing and analysis can include mathematical transformations of image data such as conversion from pixel intensities and forming data classification sets, histograms, plots, regressions, inversions, combinations, identifications, or selections that may include all image data, or only a certain subset of available image data. Image pixels can be classified and distributed based on the classification of each image pixel intensity, or the image pixels can be grouped or paired together with other pixels based on their location in the image. Likewise, the emission intensity of a fluorescence image may be measured or calculated based on all the pixels in a digital image, nearly all the pixels in a digital image, or a specific sub-population of the pixels in the digital image. The image processing methods disclosed herein may be at least partially mathematical and general in scope and may be applied where desired regardless of the apparatus or method used to obtain the images, or the nature of the sample.

The disclosed methods relate to multiplex fluorescence imaging, or hyperspectral imaging, comprising the detection and analysis of multiple biomarker targets in a biological sample. In one embodiment, a biological sample may be a fluid or a solid. By way of example and not limitation, a biological sample may include cultures, blood, plasma, serum, saliva, cerebral spinal fluid, pleural fluid, milk, lymph, sputum, semen, urine, stool, tears, saliva, needle aspirates, external sections of the skin, respiratory, intestinal, genitourinary tract, tumors, organs, cell cultures or solid tissue sections. In certain embodiments, a biological sample may be frozen, preserved, stained, or otherwise treated.

In some embodiments, a biological sample may include a tissue sample, one or more whole cells, or one or more parts of a cell. A tissue sample may include a collection of cells collected from an organism, such as bacteria, plant, an animal, or a human. A tissue sample may also include a serial section of sample tissue, such as a serial section of formalin-fixed paraffin-embedded (FFPE) tissues or fresh frozen tissues. By way of example and not limitation, human tissue may include epithelium, connective tissues, blood vessels, bone, cartilage, muscle tissue, and nerve tissue. The source of the tissue sample may be from fresh, frozen and/or preserved organ or tissue sample or biopsy.

Certain biological samples described herein may undergo staining with one or more fluorescent probes. In some embodiments, at least one fluorescent probe may be added to the sample for staining by an autostainer or manually by an operator. In one embodiment, at least one target biomarker is preferentially stained by the fluorescent probes. In certain embodiments, the sample can be multiplexed. The term "multiplex" is used to describe a process or kit by which a sample is labeled or stained with a plurality of different fluorescent probes, each fluorescent probe targeting at least one specific biomarker of interest. In some embodiments, multiplex imaging can include up to 2, 4, 6, 8, 10, 12, 16, 20, 24, 30, 40, 50, 60, 70, 80, 90, 100, or more fluorescent probes that each use specific fluorphores that emit detectable signal at different wavelengths, wherein the fluorescent probes are used to acquire a multispectral series of fluorescence images.

For some of the methods described herein, either of two immunofluorescence (IF) methods can be employed: Direct (Primary) IF or Indirect (Secondary) IF. In the direct method, a fluorescent probe is made by conjugating a fluorophore label directly to the primary antibody that will be reacting with the target biomarker. The indirect method involves a two-step incubation process: 1) a primary antibody binds to the target biomarker, 2) a fluorophore-labeled secondary antibody recognizes and binds to the primary antibody. In one embodiment, to prevent the secondary antibody from cross-reacting with endogenous immunoglobulins in a sample, the primary antibody may be derived from a different organism species than that of the sample. The secondary antibody may be directed against immunoglobulins of the host species of the primary antibody. Secondary antibodies can be modified and conjugated in multiple ways for purposes of visualization and signal amplification. In certain embodiments, secondary antibodies may be conjugated with fluorphores which emit upon photoexcitation. In other embodiments, enzymatic labels can also be conjugated to the secondary antibodies. In alternative embodiments, for signal amplification, polyclonal or biotinylated secondary antibodies can be employed.

In certain embodiments of the methods described herein, fluorophores are conjugated with antibodies to create fluorescent probes for use as detection reagents for specific targeted biomarkers. The fluorophores of the fluorescent probes can absorb and emit light within a range of wavelengths, normally referred to as the excitation and emission spectra. The light emitted by the fluorophores of the fluorescent probes can be detected by fluorescence microscopy. In further embodiments, the fluorescent probe can be a reactive dye, an organic dye, a fluorescent protein, a quantum dot, non-protein organic molecules, a nanoparticle, or the like.

In some embodiments, examples of antibodies (and the corresponding diseases/disease cells) suitable for production of fluorescent probes to be use according to the methods disclosed herein include, but are not limited to, anti-estrogen receptor antibody (breast cancer), anti-progesterone receptor antibody (breast cancer), anti-p53 antibody (multiple cancers), anti-Her-2/neu antibody (multiple cancers), anti-EGFR antibody (epidermal growth factor, multiple cancers), anti-cathepsin D antibody (breast and other cancers), anti-Bcl-2 antibody (apoptotic cells), anti-E-cadherin antibody, anti-CA125 antibody (ovarian and other cancers), anti-CA15-3 antibody (breast cancer), anti-CA19-9 antibody (colon cancer), anti-c-erbB-2 antibody, anti-P-glycoprotein antibody (MDR, multi-drug resistance), anti-CEA antibody (carcinoembryonic antigen), anti-retinoblastoma protein (Rb) antibody, anti-ras oneoprotein (p21) antibody, anti-Lewis X (also called CD15) antibody, anti-Ki-67 antibody (cellular proliferation), anti-PCNA (multiple cancers) antibody, anti-CD3 antibody (T-cells), anti-CD4 antibody (helper T cells), anti-CD5 antibody (T cells), anti-CD7 antibody (thymocytes, immature T cells, NK killer cells), anti-CD8 antibody (suppressor T cells), anti-CD9/p24 antibody (ALL), anti-CD10 (also called CALLA) antibody (common acute lymphoblasic leukemia), anti-CD11c antibody (Monocytes, granulocytes, AML), anti-CD13 antibody (myelomonocytic cells, AML), anti-CD14 antibody (mature monocytes, granulocytes), anti-CD15 antibody (Hodgkin's disease), anti-CD19 antibody (B cells), anti-CD20 antibody (B cells), anti-CD22 antibody (B cells), anti-CD23 antibody (activated B cells, CLL), anti-CD30 antibody (activated T and B cells, Hodgkin's disease), anti-CD31 antibody (angiogenesis marker), anti-CD33 antibody (myeloid cells, AML), anti-CD34 antibody (endothelial stem cells, stromal tumors), anti-CD35 antibody (dendritic cells), anti-CD38 antibody (plasma cells, activated T, B, and myeloid cells), anti-CD41 antibody (platelets, megakaryocytes), anti-LCA/CD45 antibody (leukocyte common antigen), anti-CD45RO antibody (helper, inducer T cells), anti-CD45RA antibody (B cells), anti-CD39, CD100 antibody, anti-CD95/Fas antibody (apoptosis), anti-CD99 antibody (Ewings Sarcoma marker, MIC2 gene product), anti-CD106 antibody (VCAM-1; activated endothelial cells), anti-ubiquitin antibody (Alzheimer's disease), anti-CD71 (transferrin receptor) antibody, anti-c-myc (oncoprotein and a hapten) antibody, anti-cytokeratins (transferrin receptor) antibody, anti-vimentins (endothelial cells) antibody (B and T cells), anti-HPV proteins (human papillomavirus) antibody, anti-kappa light chains antibody (B cell), anti-lambda light chains antibody (B cell), anti-melanosomes (HMB45) antibody (melanoma), anti-prostate specific antigen (PSA) antibody (prostate cancer), anti-S-100 antibody (melanoma, salivary, glial cells), anti-tau antigen antibody (amyloid associated disease), anti-fibrin antibody (epithelial cells), anti-keratins antibody, anti-cytokeratin antibody (tumor), anti-alpha-catenin (cell membrane), or anti-Tn-antigen antibody (colon carcinoma, adenocarcinomas, and pancreatic cancer).

As used in this disclosure, a biomarker can be a molecular biomarker with physical properties which allow them to be detected and/or measured in biological samples, and include nucleic acid-based biomarkers such as gene mutations or polymorphisms and quantitative gene expression analysis, nucleic acids (e.g., polynucleotides, DNA, RNA) peptides, proteins (e.g., antibodies or aptamers), polysaccharides, lipids, metabolites, enzymes, enzyme substrates, ligands, receptors, antigens, haptens, and other molecules. In some embodiments, a biomarker is a specific target of a fluorescent probe and may be present on or within a biological sample. By way of example and not limitation, a target biomarker may be a molecule on the surface of a cell, within a cell, the surface of a tissue, or within a tissue. In another embodiment, a biomarker may be a molecule soluble in a body fluid, such as blood, blood plasma, serum, or urine. Biomarkers can also be classified based on their application, such as diagnostic biomarkers, staging of disease biomarkers, disease prognosis biomarkers (cancer biomarkers), and biomarkers for monitoring the clinical response to an intervention. Another category of biomarkers may include those used in decision making during early drug development. In certain such embodiments, pharmacodynamic biomarkers are markers of a certain pharmacological response and are of special interest, for example, in dose optimization studies. In some embodiments, biomarker targets that may be detected and analyzed using the methods disclosed herein may include, but are not limited to, prognostic targets, hormone or hormone receptor targets, lymphoid targets, tumor targets, cell cycle associated targets, and neural tissue targets.

Examples of prognostic targets may include enzymatic targets such as galactosyl transferase II, neuron specific enolase, proton ATPase-2, or acid phosphatase.

Examples of hormone or hormone receptor targets may include human chorionic gonadotropin (HCG), adrenocorticotropic hormone, carcinoembryonic antigen (CEA), prostate-specific antigen (PSA), estrogen receptor, progesterone receptor, androgen receptor, gC1q-R/p33 complement receptor, IL-2 receptor, p75 neurotrophin receptor, PTH receptor, thyroid hormone receptor, or insulin receptor.

Examples of lymphoid targets may include alpha-1-antichymotrypsin, alpha-1-antitrypsin, B cell target, bcl-2, bcl-6, B lymphocyte antigen 36 kD, BM1 (myeloid target), BM2 (myeloid target), galectin-3, granzyme B, HLA class I Antigen, HLA class II (DP) antigen, HLA class II (DQ) antigen, HLA class II (DR) antigen, human neutrophil defensins, immunoglobulin A, immunoglobulin D, immunoglobulin G, immunoglobulin M, kappa light chain, kappa light chain, lambda light chain, lymphocyte/histocyte antigen, macrophage target, muramidase (lysozyme), p80 anaplastic lymphoma kinase, plasma cell target, secretory leukocyte protease inhibitor, T cell antigen receptor (JOVI 1), T cell antigen receptor (JOVI 3), terminal deoxynucleotidyl transferase, or unclustered B cell targets.

Examples of tumor targets may include alpha fetoprotein, apolipoprotein D, BAG-1 (RAP46 protein), CA19-9 (sialyl lewisa), CA50 (carcinoma associated mucin antigen), CA125 (ovarian cancer antigen), CA242 (tumor associated mucin antigen), chromogranin A, clusterin (apolipoprotein J), epithelial membrane antigen, epithelial-related antigen, epithelial specific antigen, gross cystic disease fluid protein-15, hepatocyte specific antigen, heregulin, human gastric mucin, human milk fat globule, MAGE-1, matrix metalloproteinases, melan A, melanoma target (HMB45), mesothelin, metallothionein, microphthalmia transcription factor (MITF), Muc-1 core glycoprotein. Muc-1 glycoprotein, Muc-2 glycoprotein, Muc-5AC glycoprotein, Muc-6 glycoprotein, myeloperoxidase, Myf-3 (Rhabdomyosarcoma target), Myf-4 (Rhabdomyosarcoma target), MyoD1 (Rhabdomyosarcoma target), myoglobin, nm23 protein, placental alkaline phosphatase, prealbumin, prostate specific antigen, prostatic acid phosphatase, prostatic inhibin peptide, PTEN, renal cell carcinoma target, small intestinal mucinous antigen, tetranectin, thyroid transcription factor-1, tissue inhibitor of matrix metalloproteinase 1, tissue inhibitor of matrix metalloproteinase 2, tyrosinase, tyrosinase-related protein-1, villin, or von Willebrand factor.

Examples of cell cycle associated targets may include apoptosis protease activating factor-1, bcl-w, bcl-x, bromodeoxyuridine, CAK (cdk-activating kinase), cellular apoptosis susceptibility protein (CAS), caspase 2, caspase 8, CPP32 (caspase-3), CPP32 (caspase-3), cyclin dependent kinases, cyclin A, cyclin B1, cyclin D1, cyclin D2, cyclin D3, cyclin E, cyclin G, DNA fragmentation factor (N-terminus), Fas (CD95), Fas-associated death domain protein, Fas ligand, Fen-1, IPO-38, Mcl-1, minichromosome maintenance proteins, mismatch repair protein (MSH2), poly (ADP-Ribose) polymerase, proliferating cell nuclear antigen, p16 protein, p27 protein, p34cdc2, p57 protein (Kip2), p105 protein, Stat 1 alpha, topoisomerase I, topoisomerase II alpha, topoisomerase III alpha, or topoisomerase II beta.

Other suitable biomarker targets may include centromere protein-F (CENP-F), giantin, involucrin, lamin A&C (XB 10), LAP-70, mucin, nuclear pore complex proteins, p180 lamellar body protein, ran, cathepsin D, Ps2 protein, Her2-neu, P53, S100, epithelial target antigen (EMA), TdT, MB2, MB3, PCNA, or Ki67.

A digital imaging system of a fluorescence microscope may be used to image a biological sample of interest after staining the biological sample with one or more fluorescent probes that may be targeting one or more biomarkers in the sample. In some embodiments, the digital imaging system may include one or more processors, excitation light sources and a digital camera with image sensors which can have adjustable acquisition setting used to acquire the image intensity values from the light emitted from the sample, such as the light emitted by fluorescent probes bound to target biomarkers.

In an embodiment of a fluorescent microscope for use with the methods described herein, the fluorescent microscope systems may be configured for highly multiplexed immunofluorescent microscopy where the system includes acquisition settings for multiple imaging channels with the desired optics, filters (e.g., excitation filter, dichroic beam-splitter, and emission filter, etc.), excitation light, exposure time, sensors, processors, etc., to acquire the desired emission wavelengths from multiple fluorophores. For purposes of explanation and example, and not limitation, the channels may include filter sets designed so that the excitation filter has a defined band of wavelengths that it allows through to excite the appropriate fluorophores of the fluorescent probes bound to biomarker targets. The excited fluorescent probes then emit energy wavelengths that may be shifted towards the red end of the spectrum (compared to the excitation light). The emission wavelengths that are allowed through the dichroic beam-splitter and pass through the emission filter may then be acquired by the digital sensor. In some embodiments of the current disclosure, each of these filter sets in the fluorescent microscope system that are designed to excite and acquire the emission wavelengths from a specific fluorescent probe may be called an image acquisition channel or a spectral channel. In certain embodiments, a fluorescence microscope used with the methods described herein may have ranging from 2 to 5, 2 to 10, 2 to 20, 2 to 30, 2 to 40, 2 to 50, or more, image acquisition channels. In some embodiments, the channels may be optimized for use in one or more of the infrared, visible, or ultraviolet spectrums. In some embodiments, the channels may be designed for use with excitation wavelengths from approximately 390 nm to 850 nm, and emission wavelengths from approximately 400 nm to 900 nm.

In certain embodiments, the image acquisition channel optimized to capture the emission wavelengths of a specific fluorescent probe used to stain a sample may be called the "donor channel." Alternatively, those image acquisition channels that are not the donor channel but that may still receive or detect overlapping signal from emission wavelengths (i.e., spectral overlap, or crosstalk) coming from the donor fluorescent probe, may be called a "recipient channel." They are called a recipient channel herein because, while this channel is not optimized or intended for receiving signal from the donor fluorescent probe, the recipient channel may still detect spectral crosstalk emission signal from the donor fluorescent probe and other fluorescence sources. This crosstalk emission signal, or spectral overlap, may contribute to the observed intensity values of the acquired digital image.

For some embodiments of the disclosure, a fluorescent microscope system may acquire intensity values from a digital image of a sample taken while using one or more donor channels and acquire intensity values from a digital image of the same sample using one or more recipient channels. In such embodiments, the donor channel image and the recipient channel image(s) may have intensity values which may be influenced by spectral crosstalk or spectral overlap. In certain such embodiments, a specific donor channel image and a specific recipient channel image may be designated as a donor-recipient image pair. In such a donor-recipient image pair, the acquired recipient channel intensity value may include spectral crosstalk resulting from the excitation and emission of the fluorescent probe of the donor channel.

The fluorescence images acquired by an imaging system described herein may include endogenous fluorescence emission spectra, or autofluorescence, emitted from a biological sample. In some embodiments of the methods, a digital imaging system may include one or more channels designed for the detection of autofluorescence in a sample. For example, according to certain embodiments disclosed herein, a specific donor channel or a recipient channel may be designed and optimized for the detection of certain autofluorescence spectra. The autofluorescence emission may be acquired and measured for purposes of reducing the noise, spectral crosstalk, or spectral overlap from the autofluorescence in an image. Furthermore, autofluorescence may also be acquired and analyzed as it may provide useful information about the structure, chemistry, physiology, etc., of a biological sample.

In some embodiments disclosed herein, the number of channels used by a fluorescence imaging system may be 2, 3, 4, 6, 7, 8, 9, 10, 11, 12, 13, 14, 15, 16, 17, 18, 19, 20, 21, 22, 23, 24, 25, 30, 35, 40, 45, 50, 60, 70, 80, 90, 100 or more, with any one or more of those channels designated as a donor channel or a recipient channel. In some embodiment, the imaging system may have one or more dedicated autofluorescence channels which might be used to acquire background autofluorescence, or data on naturally fluorescent cellular and subcellular structures of a sample. The methods disclosed herein are not limited to reducing spectral crosstalk, or spectral overlap, between any particular number of channels. For example, a given sample might be analyzed with fluorescent probes for each of approximately from 1 to 100 channels. In such examples, the methods disclosed herein may be employed to extract donor or recipient channel images partially, mostly, or entirely free from spectral crosstalk, for any desired number of channels to be included in a final digital fluorescence image.

In some embodiments, the methods disclosed herein for the reduction of spectral crosstalk in a multispectral fluorescence image include the preparation of one or more controls, such as one or more single-color controls that may be used in the determination of a spectral crosstalk value for a given donor-recipient pair. As outlined in FIG. 1, single-color controls may be prepared for a desired number (n) fluorescent probes, where for each probe a biological sample is prepared and stained. A single-color control dataset for multiple fluorescent probes is created by imaging "n" number of samples, each sample having stained with a different fluorescent probe, and then acquiring image intensity values for each stained samples across "n" channels of the fluorescent microscope. In such embodiments for each single-color control, the donor channel may be designated as the microscope spectral channel optimized for the donor fluorescent probe and the remaining (n−1) microscope channels may be designated as recipient channels. In certain embodiments, an image from the designated donor channel and an image from one of the designated recipient channels may be considered a donor-recipient image pair.

In some embodiments of the disclosure, one or more spectral crosstalk values may be determined for a specific donor-recipient pair selected from a single-color control dataset to give an accurate measure of the spectral crosstalk from the donor channel into a recipient channel. In certain embodiments, the spectral crosstalk values may be determined for a specific donor-recipient pair by calculating the ratio of the designated donor channel intensity value to the designated recipient channel intensity value. For an image of interest, the spectral crosstalk values may be calculated using the donor and recipient intensity values of the entire image, or the donor and recipient intensity values of a certain part of the image. For example, the spectral crosstalk values may be calculated using the donor and recipient intensity values of a certain sub-population of pixels of the image. In other embodiments, the spectral crosstalk values may be calculated by calculating the mean intensity values of a donor channel fluorescence image and a recipient channel fluorescence image. In further embodiments, the spectral crosstalk values may be calculated by calculating the derivative image values of a donor channel fluorescence image and a recipient channel fluorescence image.

In some embodiments, one or more sub-populations of image pixels may be selected to limit or remove noise, limit fluorescence signal from additional probes, non-specific fluorescence, autofluorescence, image distortions, or other unwanted areas or characteristics of certain image pixels. Both noise and autofluorescence may contribute to unwanted fluorescence intensity in a fluorescence image. Noise may be defined as the unwanted nonspecific fluorescence that comes from the imaging system; this includes noise from the excitation source, camera, and external light source, etc. The nonspecific fluorescence may come from the autofluorescence of samples, vessels, and imaging medium, or from the fluorescent signal that comes from fluorophores not bound to specific targets.

In some embodiments, sub-populations of pixels may be selected based on pixel population clusters within a pixel intensity distribution of an image pixel population. In certain embodiments, a pixel intensity distribution may be generated along one, two, or more intensity based dimensional axes. An example of a one-dimensional intensity distribution is a distribution of image pixels according to donor channel pixel intensity values. An example of a two-dimensional intensity distribution is a distribution of image pixels according to donor channel pixel intensity values along a first axis, and recipient channel pixel intensity values along a second axis.

In further embodiments, distribution dimensional axes may also include parametric combinations of image pixel intensity values. In certain such embodiments, an example of a two-dimensional pixel intensity distribution with a parametric combination of pixel intensity values is a distribution of pixels according to donor channel pixel intensity values along a first axis, and the ratio of donor channel pixel intensity values to recipient channel pixel intensity values along a second axis. In other embodiments, various direct or parametric intensity distributions along one, two, or more dimensions including, but not limited to these examples, may be used for the selection of sub-populations of pixels. Based upon one or more of these distributions, one or more population clusters of image pixels may be selected for calculation of spectral crosstalk values. In some embodiments, the selection of one or more population clusters may be optimized for calculation of crosstalk values with maximized signal and minimized noise.

In certain embodiments, for the determination of a spectral crosstalk value, a sub-population of image pixels is selected by performing linear regression of the recipient channel pixel intensity values and the donor channel pixel intensity values. In other embodiments, a sub-population of image pixels may be selected by choosing those donor channel and/or recipient channel image pixels that are a certain value or percentage above and/or below observed intensity values or within a certain intensity value range of an average intensity value, a center intensity value, a slope value, or other metric of the intensity values of the donor channel and/or recipient channel image pixels.

In specific embodiments, for each donor-recipient image pair, a 2D histogram of donor channel intensity values versus recipient channel intensity values may be created. Then, bin centers for a recipient channel intensity bin associated with the max count in each donor intensity bin may be identified. A moving variance can be calculated for these bin centers. A threshold value may be determined by the approximately $70^{th}$, $75^{th}$, $80^{th}$, $85^{th}$, $90^{th}$, $95^{th}$ or other percentile of all the moving variances. These bin centers may be separated into groups by comparing their moving variance values with a threshold value. In certain embodiments, continuous bin centers may be in the same group. A slope backbone for each group may be calculated by linear regression of the bin centers in the group and their corresponding bin centers for donor channel intensity value bins. In certain specific embodiments, the slope backbone may be compared to a seed value. In some embodiments, a seed value may be an initial selection of one or more slope values from known fluorophore properties and instrument acquisition settings. For example, a threshold of a value of approximately 0.5% to 10%, or more, for the difference between the slope backbone and the seed value may be used to determine whether the group of bin centers are associated with the image pixels of interest and the slope backbone may be used for slope cone pixel selection. If multiple slope backbones meet the criteria, the corresponding groups of bin centers may be combined into a single group and a slope backbone can be calculated for the combined bin centers. If no slope backbone meets the criteria, the slope that is closest to the seed value may be used for slope cone pixel selection.

In such embodiments, image pixels in a desired range above and below the slope backbone pixel intensity value may be further selected as one or more sub-populations of image pixels for use in determining a spectral crosstalk value. For example, a sub-population of the slope backbone pixels, or a slope pixel cone, may be selected from those slope backbone pixels with intensity values between approximately 0.1% to 15% above and approximately 0.1% to 15% below the slope backbone value. In further examples, a slope pixel cone may be selected by selecting those donor-recipient pixel intensity value pairs located between a maximum boundary of up to approximately 15% above and a minimum boundary of up to approximately 15% below, the slope backbone value. In certain such embodiments, a donor mask may defined by identifying those donor-recipient intensity value pairs within the slope pixel cone with donor channel pixel intensity values less than 40,000 counts and greater than the larger of one of the following: (1) a donor channel pixel intensity value of approximately 100, 150, 200, 250, or more, counts, (2) a donor channel pixel intensity value where the slope ratio values distribution may be greater than approximately 0.5% to 10% from a stable centroid value of the slope ratio values, or (3) a donor channel pixel intensity value where a second moment of the slope ratio values distribution may be greater than approximately 1.0×, 1.1×, 1.2×, 1.3×, 1.4×, 1.5×, 1.6×, 1.7×, 1.8×, 1.9×, 2.0×, or more, of the slope ratio values distribution at the stable centroid value of the slope ratio values. Wherein, the slope ratio values may be calculated by dividing the recipient channel pixel intensity values by the donor channel pixel intensity values for each of the donor-recipient image pairs within the slope pixel cone. In particular embodiments, one or more selected sub-populations of image pixels may be used as an image mask to designate the pixels in the digital image for use in determining a spectral crosstalk value. In further such embodiments, an image mask defined by a certain sub-population of pixels may be expanded, dilated, or contracted in a desired direction or volume by a selected amount or number of pixels. For example, the image mask may be a donor mask comprising certain pixels from the donor-recipient image pairs in the slope pixel cone. Those donor mask pixels from the slope pixel cone may then be identified in the digital image (e.g., the digital image space with x and y coordinates of the pixels identified in the slope pixel cone) and define the bounds of an image mask. The image mask may then be dilated or contracted by 1, 2, 3, 4, 5, 6, 7, 8, 9, or 10 pixels, or more, in both x and y directions in the image space.

In some embodiments, the spectral crosstalk values may be determined for multiple donor-recipient image pairs. For example, spectral crosstalk values may be determined for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more, donor-recipient image pairs. In certain embodiments, the spectral crosstalk values from two or more donor-recipient image pairs may be used to create a pairwise comparison matrix, or a spectral crosstalk matrix, of spectral crosstalk values, wherein for each selected channel, the donor channel intensity value for a specific fluorescent probe is compared with the recipient channel intensity values of the same probe in each of the selected channels. In some embodiments, a spectral crosstalk matrix comprises of a set of coefficients, one for each donor-recipient channel pair, which may define the amount of donor-derived signal to subtract from the paired recipient channel on a pixel-by-pixel basis to output channels with pixel intensities that reflect single biomarker signal.

According to some embodiments of the current disclosure, spectral crosstalk in one or more multispectral fluorescence images, or a multispectral series of fluorescence images, may be reduced by the application of the spectral crosstalk matrix to intensity values of the multispectral fluorescence images of a sample stained with fluorescent probes used in the creation of the spectral crosstalk matrix. In such embodiments, the spectral crosstalk matrix may be applied to one or more multispectral fluorescence images according to the following formula:

$$[A]_F = [C]^{-1}[A]_I$$

wherein $[A]_F$ is the final multispectral fluorescence image after reduction of the spectral crosstalk; $[C]^{-1}$ is the inverse of the spectral crosstalk matrix; and $[A]_I$ are the intensity values of the originally acquired multispectral fluorescent image.

In certain such embodiments, the spectral crosstalk matrix may be applied to the recipient channel intensity value of at least one multispectral fluorescence image. In other such embodiments, the spectral crosstalk matrix may be applied to the desired channel intensity value of a multispectral series of fluorescence images. The spectral crosstalk matrix may be applied to at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more, multispectral fluorescence images of a sample, wherein each image may be acquired using a different channel or acquisition settings of a fluorescence imaging device.

Figure 2A:
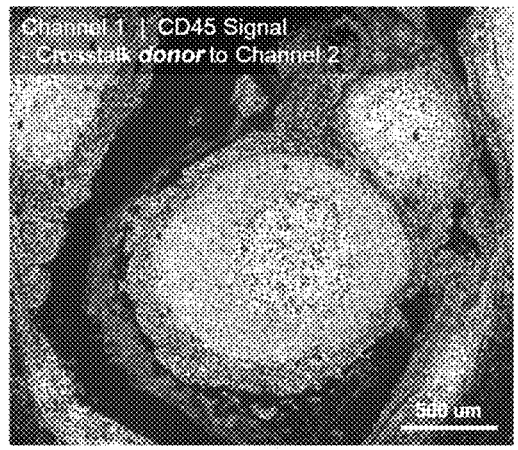
FIG. 2A shows a fluorescence image acquired using donor channel 1 of a sample stained with CD45 donor fluorescent probe.
Figure 2B:
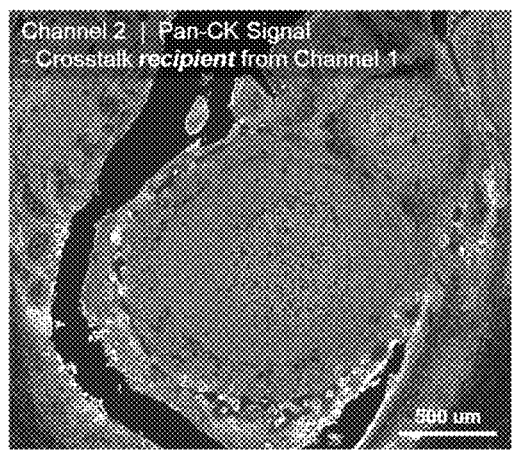
FIG. 2B shows a fluorescence image acquired using recipient channel 2 displaying the spectral crosstalk from the CD45 donor fluorescent probe into recipient channel 2. The recipient channel 2 was set up with acquisition settings for imaging of a Pan-CK fluorescent probe, not the CD45 donor fluorescent probe.
Figure 2C:
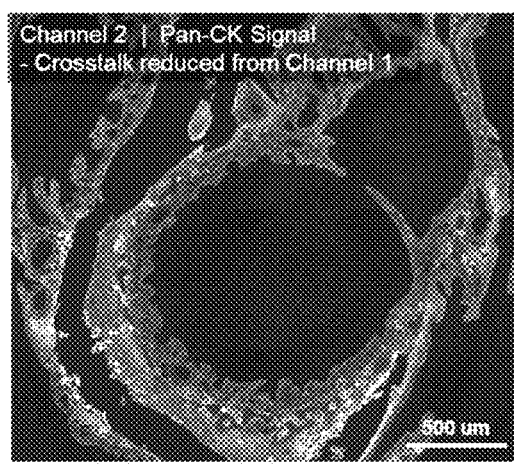
FIG. 2C shows a fluorescence image acquired using recipient channel 2 after reducing the spectral crosstalk from the CD45 donor fluorescent probe into the recipient channel 2.

Examples of spectral crosstalk and the results of using the methods disclosed herein may be seen in FIGS. 2A-2C. Fluorescent channel crosstalk may occur when fluorophore emission and excitation spectra from two or more channels overlap with one another. Each fluorescent marker provides signal in its respective acquisition channel. At the same time, each fluorescent marker is a potential donor of crosstalk into one or more recipient channels. FIG. 2A shows a fluorescence image acquired with donor channel 1 of a sample stained with CD45 donor fluorescent probe. The donor channel 1 has acquisition settings tuned for imaging the CD45 donor fluorescent probe signal. As seen in FIG. 2B, the spectral crosstalk from the CD45 donor fluorescent probe may be seen in an image acquired using recipient channel 2. The recipient channel 2 has acquisition setting tuned for imaging of a Pan-CK fluorescent probe. FIG. 2C shows the results of reducing the spectral crosstalk from the donor fluorescent probe into the recipient channel 2.

Any of the acquired fluorescence images or associated files, whether raw or processed, can be stored in any appropriate storage medium at any point during the performance of any embodiment of the present invention. The storage medium includes, but is not limited to, one or more of a solid-state drive, a hard disk, a random-access memory (RAM), a read only memory (ROM), a storage of distributed computing systems, an optical disk, a flash memory device, a memory card, or the like.

Some embodiments of the invention include at least one non-transitory computer readable medium which can store instructions for performing the described methods and any steps thereof, including any combinations of the same. For example, the non-transitory computer readable medium can store instructions for execution by one or more processors or similar devices.

Further embodiments of the present invention can also include a computer or apparatus (e.g. a phone, a tablet, a PDA, or the like) which reads out and executes computer executable instructions, such as a non-transitory computer-readable medium, recorded or stored on a storage medium (which may be the same as or different than the storage medium for storing images or files), to perform the functions of any embodiment. The computer may include one or more of a central processing unit (CPU), micro processing unit (MPU), or other circuitry, and may include a network of separate computers or separate computer processors. The computer executable instructions may be provided to the computer, for example, from a network or the storage medium. The computer or apparatus can also be configured to display, such as on a monitor or screen, any of the images or files, whether raw or processed.

Examples

The disclosed examples are only exemplary of the methods and systems provided herein and do not limit the scope of any subsequent claims.

Methods of fluorescence microscopy include highly multiplexed fluorescence imaging used for concurrent detection and analysis of multiple biomarkers in a sample. This method can be challenged by the spectral overlap, or spectral crosstalk, of two or more fluorescent probes with fluorophores that demonstrate overlapping emission spectra. This crosstalk may make it difficult to determine the presence and spatial distribution of fluorescent signals from multiple biomarkers detected in the sample.

A method for reducing spectral crosstalk may include one or more image processing steps including the generation of a single-color control dataset to determine a spectral crosstalk matrix which can then be applied to an acquired image to isolate biomarker signals into individual channels from input data that contains spectral overlap. The spectral crosstalk matrix consists of a set of coefficients, one for each donor-recipient image pair of the single-color control dataset, which is applied to the intensity values of the image to reduce the amount of donor-derived spectral crosstalk and more accurately show single biomarker emission signals.

Single-Color Control Dataset

A single-color control dataset was created to determine the spectral crosstalk matrix coefficients for fluorescent probes of interest. Seventeen (17) tissue samples were prepared and each fixed to microscope slides. Each sample was stained with a single fluorescent probe targeting a specific biomarker. Each of the seventeen stained samples was imaged with one of seventeen spectral channels of a fluorescent microscope and image intensity values were acquired to generate the single-color control image dataset containing seventeen image sets.

For each sample imaging round, a donor channel was designated as the spectral channel optimized for a specific fluorescence probe (donor) being used to target a specific biomarker; the rest of the seventeen channels were designated as recipient channels. The intensity values for the donor channel were acquired (donor channel intensity values) using the channel optimized for the excitation and emission spectrum of the designated fluorescent probe (donor fluorescent probe), and then the intensity values were acquired for the remaining recipient channels (recipient channel intensity values) to detect any crosstalk emission spectra resulting from excitation of the donor fluorescent probe.

FIG. 3 is a table showing the spectral channels by row, with their respective fluorophores and the target biomarker (channels 2, 3, and 7 were not used). For example, donor channel 4 was optimized for the fluorophore Argo515 which was conjugated with an antibody to create a fluorescent probe targeting CD31 (the remaining channels were designated as recipient channels when using channel 4 as the donor channel). The single-color control dataset was created by imaging all the stained samples, and acquiring intensity value data for the donor channel and the recipient channel pairs for each of the samples.

Slope Pixel Selection

For each of the fluorescent probes used during the creation of the single-color control dataset, donor-recipient image pairs were formed comprising the donor channel image and each of the recipient channel images for that fluorescent probe. The methods disclosed herein are applied to each of the donor-recipient image pairs.

Figure 4:
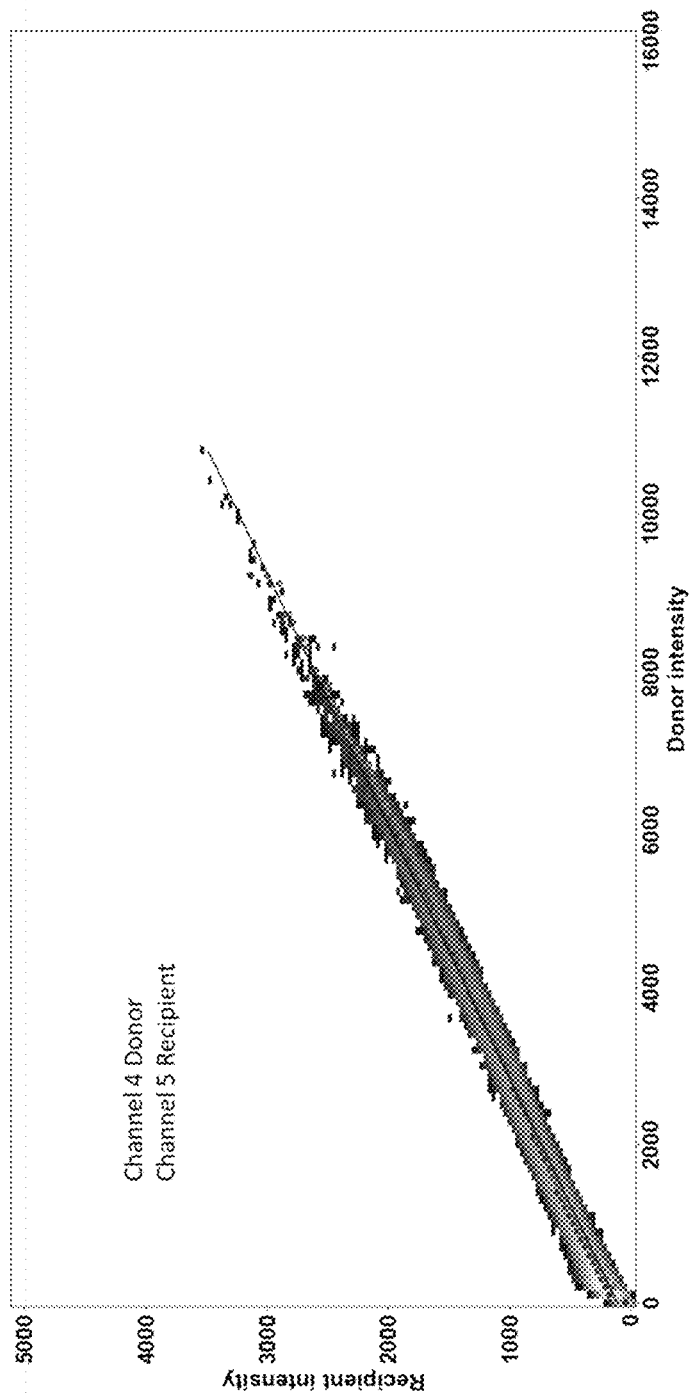
FIG. 4 is a 2-D histogram showing recipient (channel 5) pixel intensities versus donor (channel 4) pixel intensities of the donor-recipient image pair.
Figure 5:
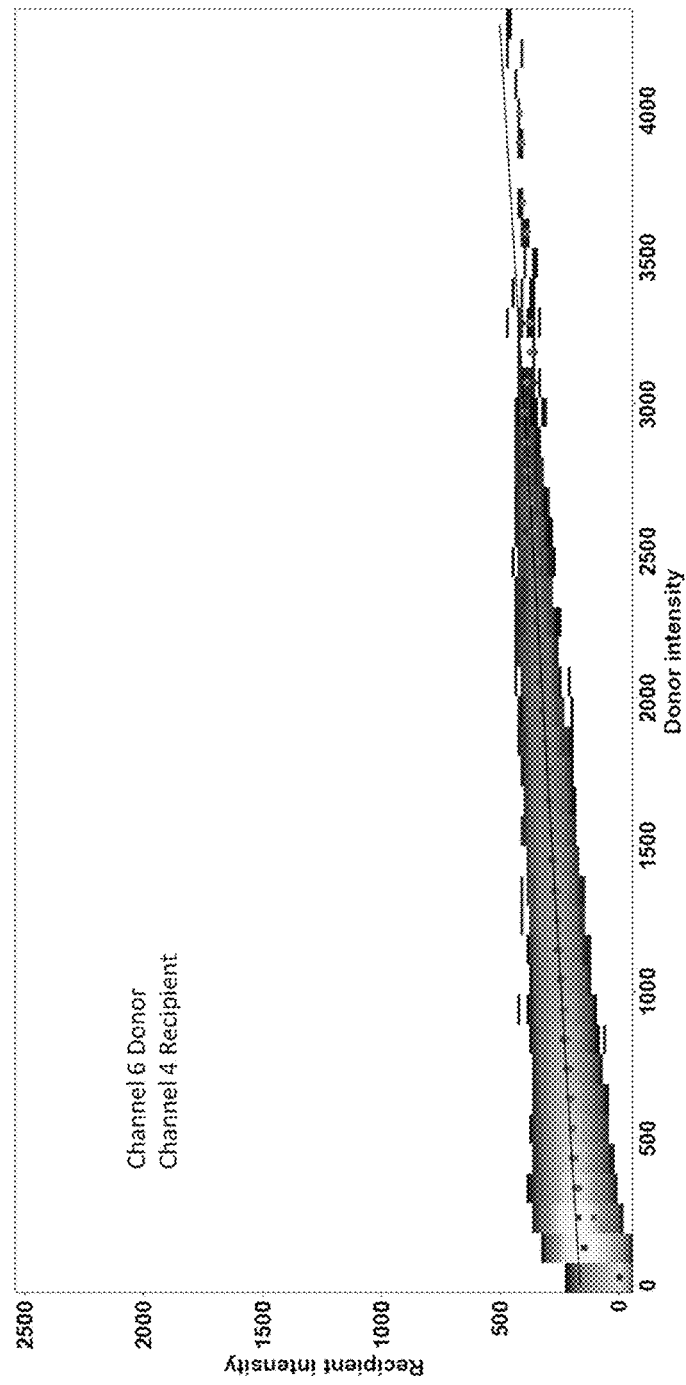
FIG. 5 is a 2-D histogram showing recipient (channel 4) pixel intensities versus donor (channel 6) pixel intensities of the donor-recipient image pair.

As shown in FIG. 4, a 2D histogram of donor channel 4 intensity values versus recipient channel 5 intensity values for the pixels in the donor-recipient image pair was created. Similarly, FIG. 5 shows a 2D histogram of donor channel 6 intensity values versus recipient channel 4 intensity values for pixels in that donor-recipient image pair. This is repeated for each of the donor-recipient image pairs (i.e., donor channel 4 versus recipient channels 5, 6, 8, 9, 10, 11, 12, 13, 14, 15, 16, 17, 18, 19 and 20; see, FIG. 3). The donor channel intensity values and the recipient channel intensity values were grouped into bins along their respective axis, each bin defined by a range of intensity values. Then, bin centers for a recipient channel intensity bin associated with the max count in each donor intensity bin were identified. A moving variance, normalized by the moving average of the bin centers, was then calculated for these bin centers. A threshold value (VarThre) was determined by the 90th percentile of all the moving variances. These bin centers were separated into groups by comparing their moving variance values VarThre. At this point, only continuous bin centers were in the same group.

A slope backbone for each donor-recipient image pair was calculated by linear regression of the recipient channel intensity value bin centers and their corresponding donor channel intensity value bin centers. The slope backbone is then compared to a seed value. A threshold of 0.5% for the difference between the slope backbone and the seed value was used to determine whether the group of bin centers were associated with the image pixels of interest and whether the slope backbone may be used for slope cone pixel selection. Referencing FIGS. 4 and 5, dots mark the centroids for donor intensity bins, and the linear regression line is chosen for the backbone of the slope pixel population. In rare cases in which more than one slope is found (not shown here), the line with slope closest to the seed value is chosen as the slope backbone for the slope pixel population.

If multiple slope backbones meet the criteria, the corresponding groups of bin centers may be combined into a single group and a slope backbone can be calculated for the combined bin centers. If no slope backbone meets the criteria, the slope that is closest to the seed value may be used for slope cone pixel selection.

Donor Mask and Spectral Crosstalk Matrix

Figure 6:
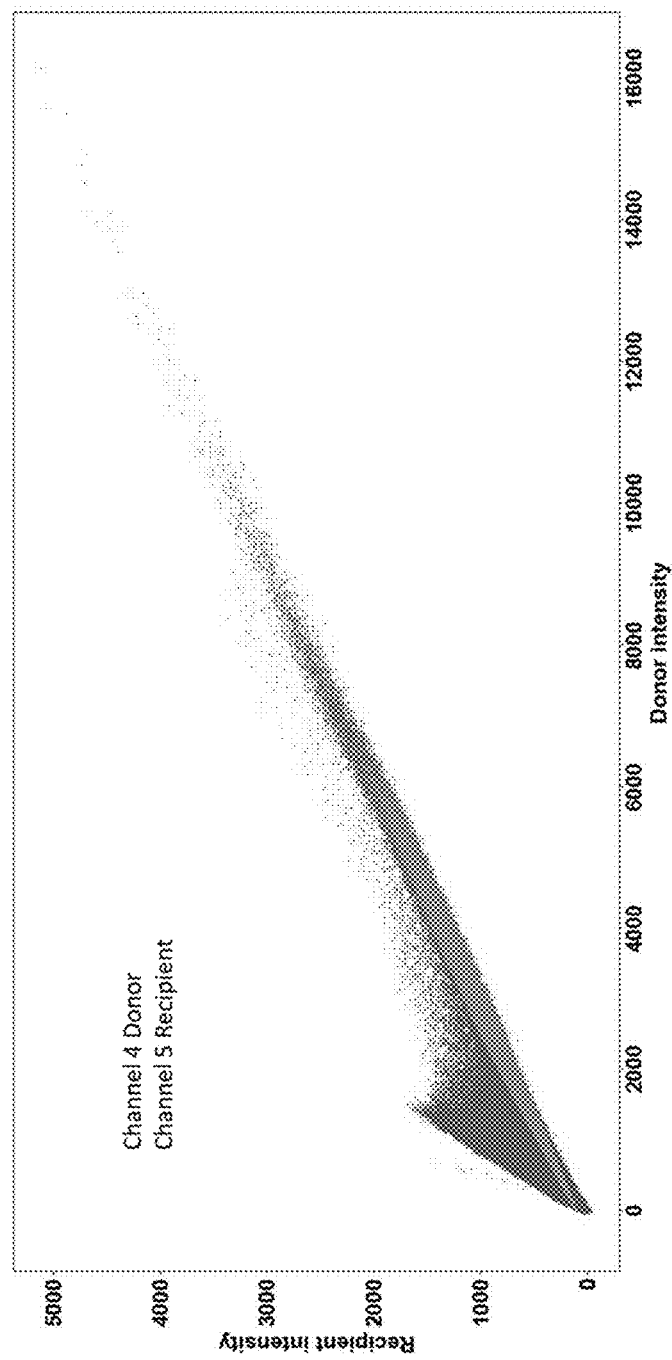
FIG. 6 is a 2-D histogram showing a slope pixel cone (light grey) selected for the donor channel 4-recipient channel 5 image pair.
Figure 7:
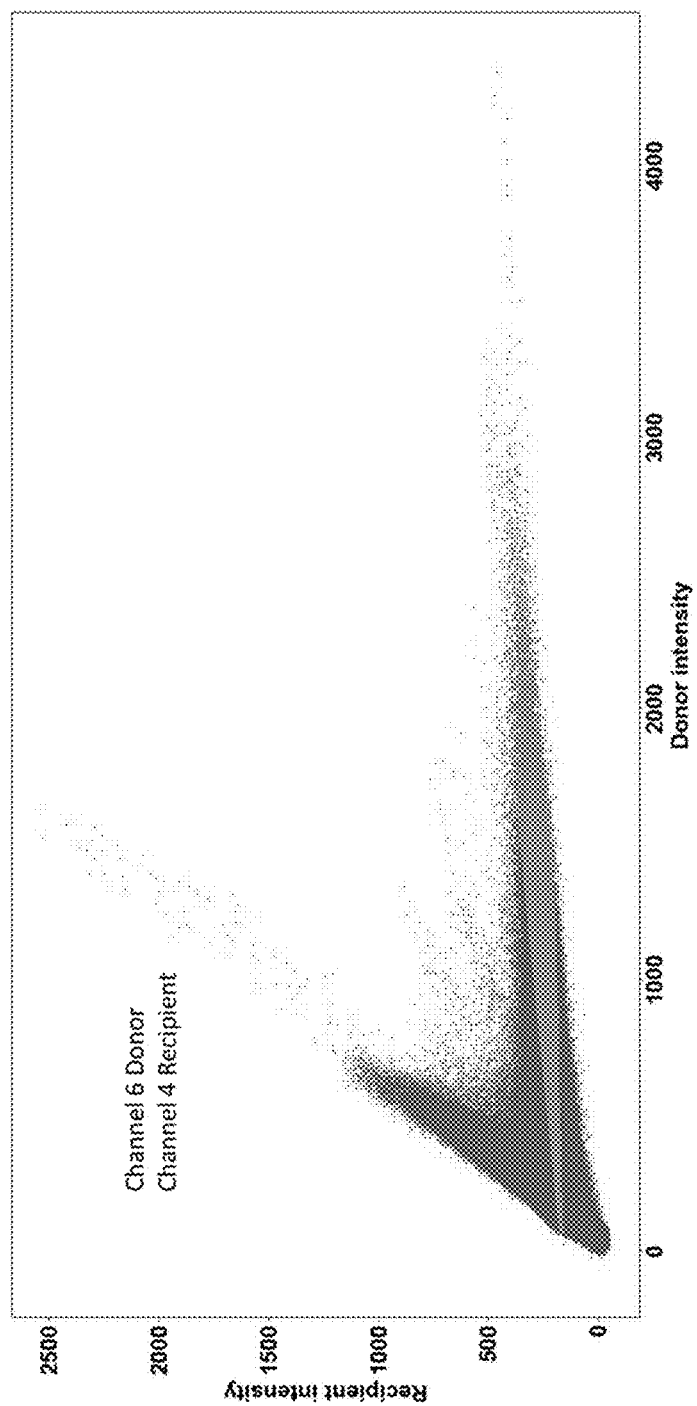
FIG. 7 is a 2-D histogram showing a slope pixel cone (light grey) selected for the donor channel 6-recipient channel 4 image pair.

As shown in FIG. 6, a sub-population of the slope backbone pixels called a slope pixel cone (light grey) was selected for the donor channel 4-recipient channel 5 image pair, with a vertex at the slope backbone y-intercept and including those slope backbone pixels with an intensity value located between 5% above and below (±0.05×) the slope backbone values. FIG. 7 shows the slope pixel cone (light grey) as selected for the donor channel 6-recipient channel 4 image pair.

Slope ratio values were calculated by dividing the recipient channel pixel intensity values by the donor channel pixel intensity values for each of the donor-recipient value pairs within the slope pixel cone. The slope ratio values were grouped into bins, each bin defined by a range of slope ratio values. Likewise, the donor channel pixel intensity values were grouped into bins for each of the donor-recipient value pairs within the slope pixel cone, each bin defined by a range of donor channel pixel intensity values.

The pixels of a donor mask were then defined by identifying those donor-recipient intensity value pairs within the slope pixel cone with donor channel pixel intensity values with a maximum of 40,000 counts and a minimum pixel intensity threshold value at the larger of one of the following: (1) a donor channel pixel intensity value of 200 counts, (2) a donor channel pixel intensity value where the slope ratio values distribution is greater than 5% from a stable centroid value of the slope ratio values, or (3) a donor channel pixel intensity value where a second moment of the slope ratio values distribution may be greater than 1.8× of the slope ratio values distribution at the stable centroid value of the slope ratio values.

Figure 8:
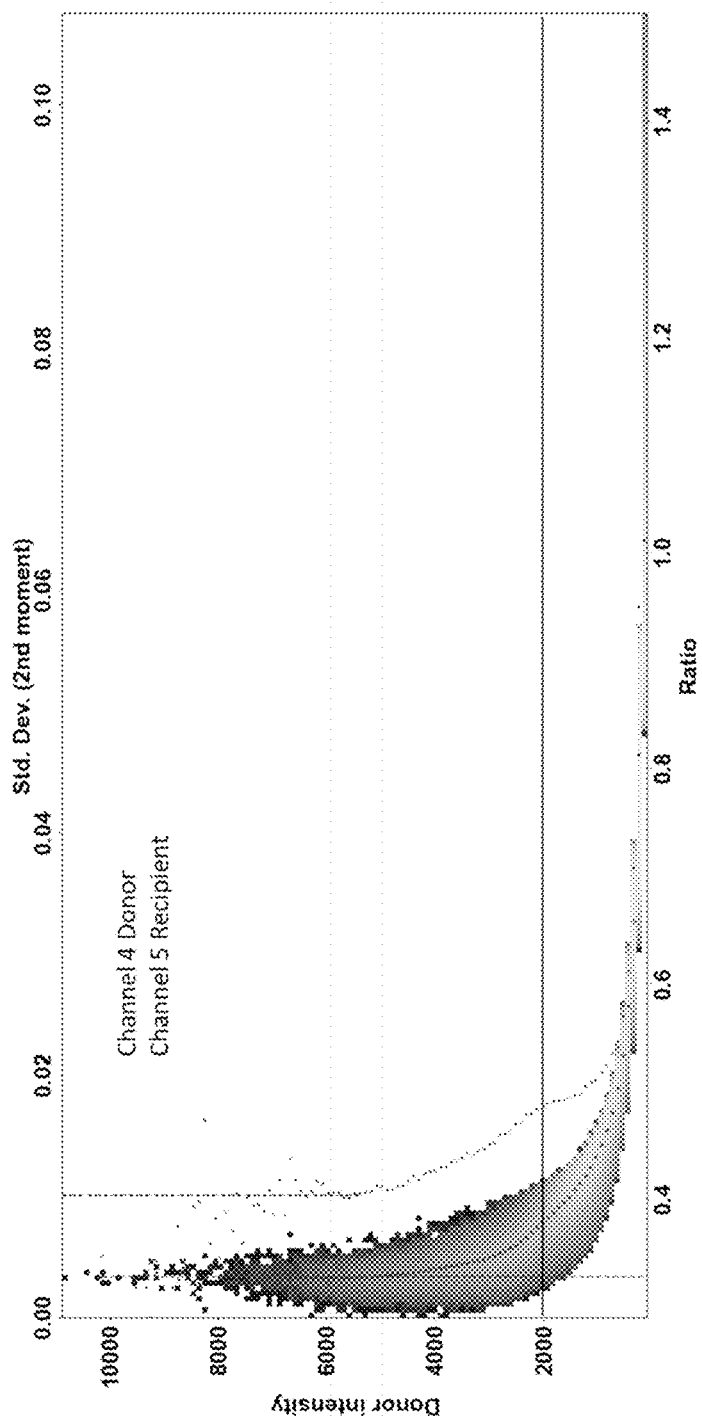
FIG. 8 is a 2D histogram of slope ratio values versus donor channel pixel intensity values within the slope pixel cone created for the donor channel 4-recipient channel 5 image pair.
Figure 9:
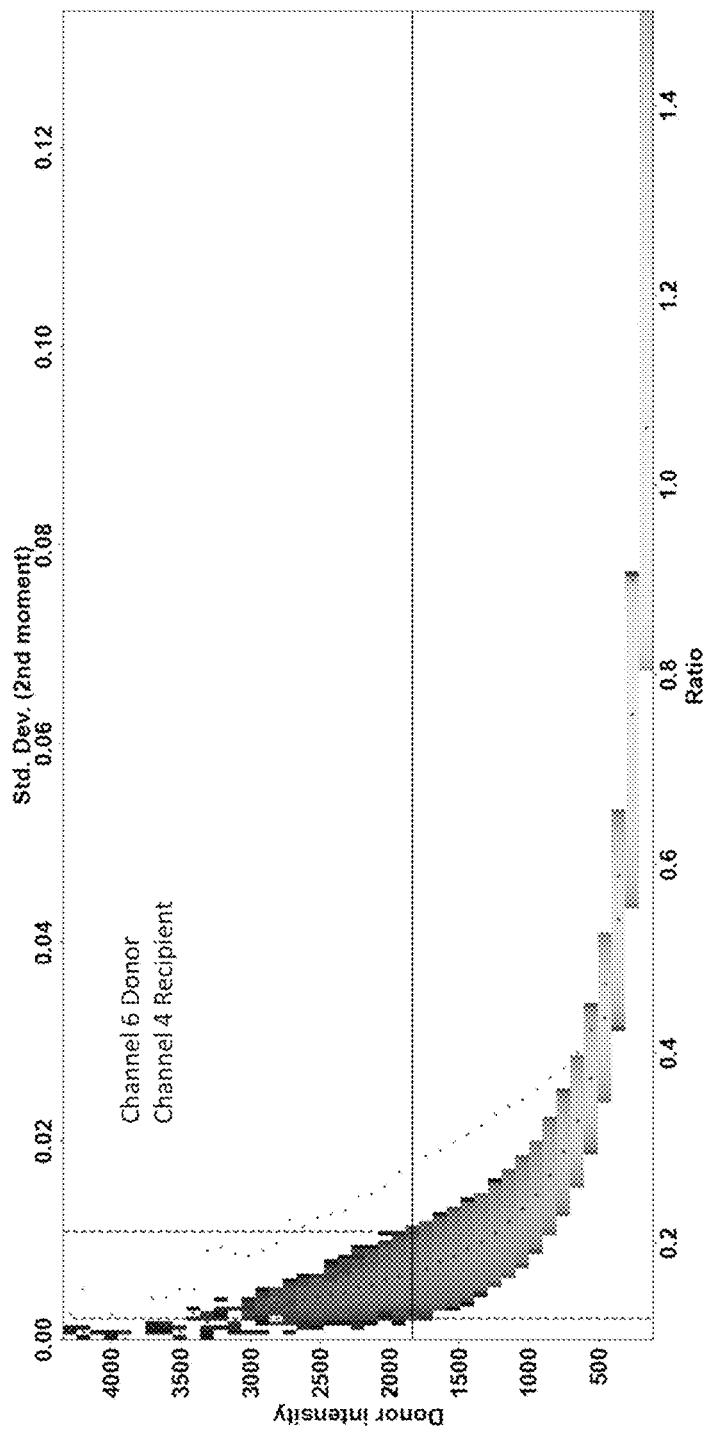
FIG. 9 is a 2D histogram of slope ratio values versus donor channel pixel intensity values within the slope pixel cone created for the donor channel 6-recipient channel 4 image pair.

FIG. 8, shows a 2D histogram of slope ratio values versus donor channel pixel intensity values within the slope pixel cone created for donor channel 4-recipient channel 5 image pair. FIG. 9 shows a 2D histogram of slope ratio values versus donor channel pixel intensity values for the donor channel 6-recipient channel 4 image pair. For FIGS. 8 and 9, the centroids dots are shown for donor intensity bins, and the vertical segmented line represents the stable ratio value, calculated by averaging ratio values at descending donor intensity bins, the dots mostly outside the main distribution mark the ratio 2nd moments (std dev, represents width, axis values across top of plot) for donor intensity bins. The horizontal line in FIGS. 8 and 9 shows the minimum pixel intensity value threshold of the donor mask pixels. The image pixels identified as the donor mask were then dilated by two pixels to give the boundary of the dilated donor mask.

For each of the donor-recipient image pairs within the dilated donor mask, the spectral crosstalk value is determined by calculating the ratio of the donor channel intensity value to the recipient channel intensity value. The spectral crosstalk values were then used to create a pairwise comparison matrix, or spectral crosstalk matrix for the donor-recipient image pairs. As shown in FIG. 10, for each channel used to create the single-color data set, donor channel intensity values for each fluorescent probe were compared with the recipient channel intensity values of the same probe to create the matrix. Each row is a donor channel, and each column is a recipient channel, and heat mapping with darker colors indicates relative larger spectral crosstalk values for the image pair.

Reducing Spectral Crosstalk in a Fluorescence Image

Figure 11:
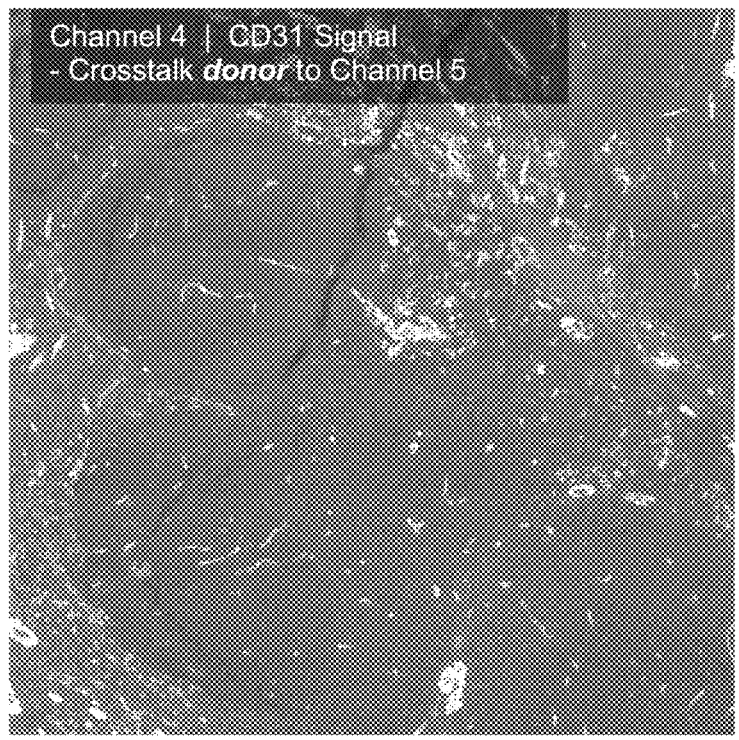
FIG. 11 is an image of a stained sample taken from a multispectral series of fluorescence images showing the signal from the fluorescence probe used for donor channel 4 (Argo 515 fluorescence probe targeting biomarker CD31).
Figure 12A:
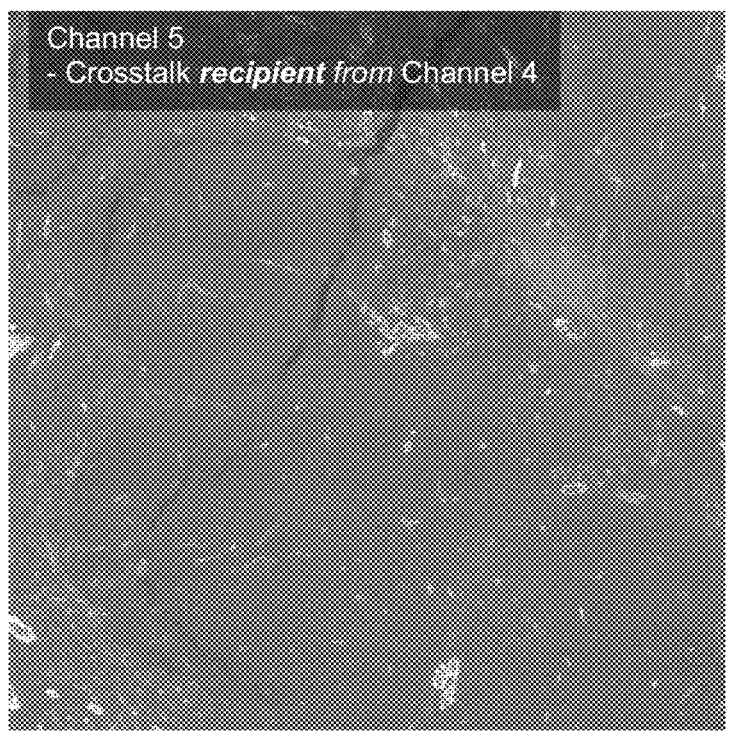
FIG. 12A is an image taken using recipient channel 5 showing the spectral crosstalk from the donor channel 4 fluorescence probe.

The spectral crosstalk matrix from the single-color control dataset was used to reduce the crosstalk in a fluorescent image. A tissue sample was prepared and stained with Argo515 fluorophore conjugated to anti-CD31 antibody (donor channel 4, FIG. 3), which was previously used to create the spectral crosstalk matrix. The stained sample was imaged using the same channel acquisition settings as those used for the Argo515 fluorescent probe during the creation of the single-color control dataset and the spectral crosstalk matrix. FIG. 11 shows the fluorescent image of the stained sample acquired using donor channel 4 showing the detected CD31 biomarker target. FIG. 12A shows the image taken using recipient channel 5 displaying significant spectral crosstalk from the donor channel 4 Argo515 fluorescence probe.

To reduce the spectral crosstalk from the donor channel, the spectral crosstalk matrix was applied to the recipient channel 5 image according to the following formula:

$$[A]_F = [C]^{-1}[A]_I.$$

Figure 12B:
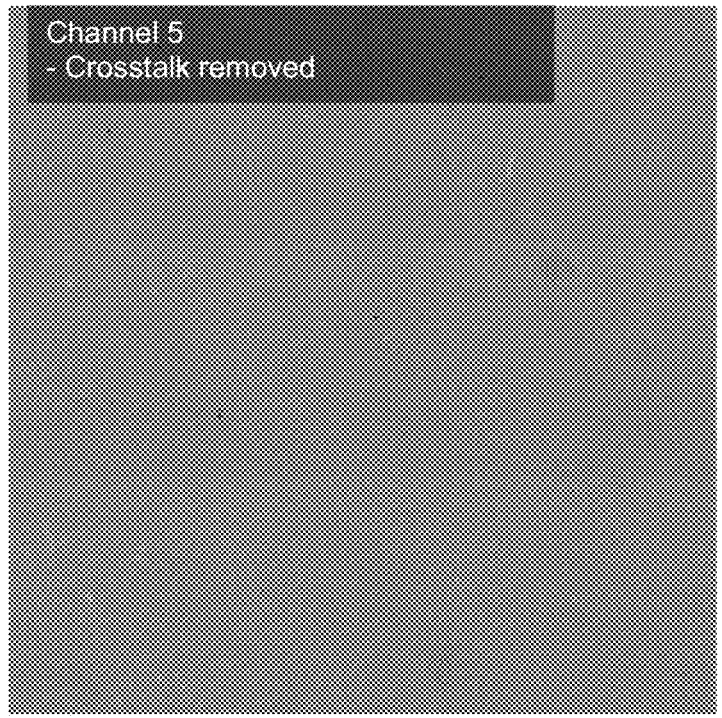
FIG. 12B is the recipient channel 5 image from FIG. 12A after the reduction of spectral crosstalk from donor channel 4 fluorescence probe.

For the formula, $[A]_F$ is the final multispectral fluorescence image after reduction of the spectral crosstalk; $[C]^{-1}$ is the inverse of the spectral crosstalk matrix; and $[A]_I$ are the intensity values of the acquired fluorescence images. FIG. 12B shows the results of applying the spectral crosstalk matrix to the recipient channel 5 image, whereby the spectral crosstalk signal has been significantly reduced.

The foregoing description, for purposes of explanation, used specific nomenclature to provide a thorough understanding of the disclosure. However, it will be apparent to one skilled in the art that the specific details are not required to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of this disclosure. The embodiments are shown and described to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents.

What is claimed is:

1. A method of reducing spectral crosstalk in a multispectral series of fluorescence images, the method comprising:
   acquiring a donor channel fluorescence image of a field of view of a biological sample stained with a donor fluorescent probe,
   acquiring at least one recipient channel fluorescence image of the field of view of the biological sample,
   wherein the donor channel fluorescence image and e at least one recipient channel image is a donor-recipient image pair,
   calculating spectral crosstalk values of the donor-recipient image pair using a sub-population of pixels of the donor channel image and corresponding pixels of the at least one recipient channel image,
   creating a spectral crosstalk matrix of the spectral crosstalk values for at least two donor-recipient image pairs,
   acquiring an initial multispectral series of fluorescence images of a biological sample that has been stained with at least two donor fluorescent probes, wherein the at least two donor fluorescent probes were also used to calculate the spectral crosstalk values, and reducing spectral crosstalk of the initial multispectral series of fluorescence images by applying the spectral crosstalk matrix to the initial multispectral series of fluorescence images according to the following formula:

$$[A]_F = [C]^{-1}[A]_I,$$

wherein $[A]_F$ represents a final multispectral series of fluorescence images after reduction of the spectral crosstalk, wherein $[C]^{-1}$ represents an inverse of the spectral crosstalk matrix, and wherein $[A]_I$ represents pixel intensity values of the initial multispectral series of fluorescence images.

2. The method of claim 1, wherein acquiring the donor channel fluorescence image comprises acquiring donor channel pixel intensity values, and wherein acquiring the at least one recipient channel fluorescence image comprises acquiring recipient channel pixel intensity values.

3. The method of claim 2, wherein calculating the spectral crosstalk values comprises calculating a ratio of the donor channel pixel intensity values to the recipient channel pixel intensity values of the donor-recipient image pair.

4. The method of claim 2, wherein the spectral crosstalk matrix is applied to the recipient channel pixel intensity values of the initial multispectral series of fluorescence images.

5. The method of claim 2, further comprising plotting the donor channel pixel intensity values versus the recipient channel pixel intensity values, thereby creating a plot of donor-recipient pixel intensity value pairs.

6. The method of claim 5, further comprising:
grouping the donor channel pixel intensity values into a series of bins that are consecutive intervals of donor channel pixel intensity values, and
grouping the recipient channel pixel intensity values into a series of bins that are consecutive intervals of recipient channel pixel intensity values.

7. The method of claim 6, further comprising:
identifying the recipient channel pixel intensity values bin having the largest pixel count for each of the donor channel pixel intensity values bins, identifying a center value of each of the recipient channel pixel intensity values bins that were identified as having the largest pixel counts,
identifying a center value of each of the donor channel pixel intensity values bins,
calculating a slope backbone by linear regression of the center values of the recipient channel pixel intensity values bins being used as dependent variables, and the center values for each donor channel pixel intensity values bins being used as independent variables, and
identifying a slope pixel cone by selecting those donor-recipient pixel intensity value pairs located between a maximum boundary of up to approximately 15% above and a minimum boundary of up to approximately 15% below, the calculated slope backbone value.

8. The method of claim 7, further comprising defining a donor mask as a sub-population of donor-recipient intensity value pairs within the slope pixel cone.

9. The method of claim 1, wherein the sub-population of pixels of the donor channel image and the corresponding pixels of the at least one recipient channel image is selected from a pixel intensity distribution of an image pixel population of the donor channel image and the at least one recipient image.

10. The method of claim 5, wherein at least one of the axes of the pixel intensity distribution comprises a parametric combination of pixel intensity values.

11. The method of claim 9, wherein the sub-population of pixels is selected from at least one pixel population cluster within the pixel intensity distribution.

12. The method of claim 1, wherein the sub-population of pixels of the donor channel image and the corresponding pixels of the at least one recipient channel image is selected from the donor-recipient image pairs in a slope pixel cone.

13. The method of claim 12, wherein the selected sub-population of pixels is used to define the pixels of a donor mask.

14. The method of claim 13, wherein the donor mask is dilated by at least one pixel.

15. The method of claim 13, wherein the pixels of the donor mask are used to calculate the spectral crosstalk values.

16. The method of claim 1, wherein the donor channel fluorescence image and the at least one recipient channel fluorescence image are acquired with acquisition settings, and
wherein the acquisition settings for each of the at least two donor probes used to acquire the initial multispectral series of fluorescence images are the same acquisition settings also used to calculate the spectral crosstalk values for each of the at least two donor probes.

17. The method of claim 1, wherein calculating the spectral crosstalk values comprises calculating the mean pixel intensity values of the donor channel fluorescence image and the at least one recipient channel fluorescence image.

18. The method of claim 1, wherein calculating the spectral crosstalk values comprises calculating the derivative image values of the donor channel fluorescence image and the at least one recipient channel fluorescence image.

19. The method of claim 1, further comprising using one or more processors to perform the method.

* * * * *